UNITED STATES PATENT OFFICE.

TRAUGOTT SANDMEYER, OF BASLE, SWITZERLAND, ASSIGNOR TO ANILINE COLOUR AND EXTRACT-WORKS, FORMERLY JOHN R. GEIGY, OF BASLE, SWITZERLAND, A CORPORATION.

PROCESS OF MAKING INDIGO.

SPECIFICATION forming part of Letters Patent No. 697,545, dated April 15, 1902.

Application filed August 23, 1901. Serial No. 72,988. (No specimens.)

*To all whom it may concern:*

Be it known that I, TRAUGOTT SANDMEYER, a citizen of the Swiss Republic, and a resident of Basle, Switzerland, have invented a new and useful Process of Making Indigo, of which the following is a specification.

In the United States Patent No. 647,280, dated April 10, 1900, I have described a process for the production of indigo consisting in the action of ammonia sulfid upon alpha-isatin-anilid. The present invention (for which patents have been applied for in Germany, G. No. 15,473, dated March 13, 1901; in France, No. 309,768, dated April 6, 1901; in England, No. 6,878, dated April 2, 1901; in Belgium, No. 11,808, dated June 6, 1901; in Russia, No. 14,095, dated May 5, 1901; in Italy, No. 456, dated May 28, 1901; in Spain, C. 3,623, dated June 11, 1901; in Austria, A. 5,407, dated April 16, 1901, and in Hungary, No. 5,676, dated April 18, 1901) is based upon the discovery that it is possible to divide this reaction into two phases—namely, in the manner that sulfureted hydrogen is allowed to act first upon an acid solution of alpha-isatin-anilid, in which case a body nearly insoluble in water and containing sulfur is formed as a brownish-gray voluminous precipitate soluble in alcohol and ether, with a brown color. This compound, which is of a very unstable nature and will be partly transformed into indigo and sulfur when washed, dried, or dissolved, has, apparently, the constitution of the still-unknown alpha-thioisatin of the formula

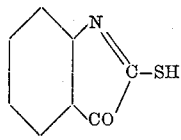

or in the tantomeric pseudoform

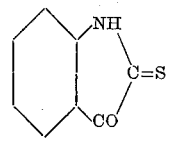

Analogous to the isatin, which gives with caustic alkalies violet-red salts changing under decoloration in salts of the isatinic acid, this alpha-thioisatin gives in watery or alcoholic solution with caustic alkalies intense violet-blue colorings, which after a short time grow pale. However, differently from isatin, the alpha-thioisatin does not transform into a thioisatinic acid, but separates into sulfur and indigo. Heated with an alkaline solution of lead oxid, the thioisatin is deprived of its sulfur, and by acidulating and warming up the obtained solution of the salt of isatinic acid the known isatin separates in red needles. Also in the faculty of forming coloring-matters with hydrazins the thioisatin corresponds completely with the isatin, the only difference being that the former coloring-matters are of a more reddish or bluish shade than those from isatin. The second phase of the reaction—the above-mentioned transformation into sulfur and indigo—takes place by the action of strong alkaline agents as well as of weak ones—as, for instance, caustic alkalies, alkali carbonates and bicarbonates, alkali sulfids and hydro sulfids, ammonia, ammonium sulfid, earth alkalies, and the like—upon the alpha-thioisatin—and even when cold and by employing very much diluted solutions of these substances. In preference the weaker alkalies, as sodium carbonate, sodium bicarbonate, magnesium hydroxid, &c., and the diluted solutions effectuate a more complete transformation of the thioisatin into indigo than, for instance, strong alkaline concentrated solutions. The presence of some sulfureted hydrogen or of some soluble hydro sulfids has proved to be very suitable in this reaction.

The following examples will serve to illustrate the manner in which the invention can be carried into practical effect. The parts are by weight.

*Example I—Production of alpha-thioisatin.*—Thirty parts of caustic-soda lye of 25° Baumé are saturated with sulfureted hydrogen and then diluted with one hundred and twenty parts of water. This solution is allowed to run while stirring into six hundred parts of water at the same time with a cold solution of twenty-two parts of alpha-isatin-anilid in one hundred parts of concentrated sulfuric acid, as is obtained, for instance, after the processes described in the specifications of the United States Patents No. 647,279 and No. 647,281, granted April 10, 1900, in such a manner that a surplus of sulfureted hydrogen preponderates till the end. As soon as a test of the filtrate with a diluted solution of sodium sulfid no more gives a precipitate after standing the precipitated alpha-thioisatin is filtered off and by washing mostly deprived of the adhering acid.

*Example II—Production of indigo.*—The filtered slightly-sour paste of alpha-thioisatin above described is diluted with water, then are added while stirring five parts of caustic-soda lye of 25° Baumé, which are first saturated with sulfureted hydrogen and diluted with forty-five parts of water. After a short time are further added twenty parts of a sodium-carbonate solution of ten per cent., upon which the formation of indigo takes place immediately. It is finished when by treating a sample with hot alcohol no more alpha-thioisatin can be dissolved. The indigo, separated in extremely fine division, is filtered off and, in order to deprive it from the admixed sulfur, either boiled with a solution of sodium sulfid refiltered and washed, or dried and treated with carbon disulfid in an extracting apparatus. In this example the sodium carbonate or the sodium sulfid can be replaced by one of the already-mentioned substances of alkaline reaction and the process, as well as the result, remain the same.

What I claim as new, and desire to secure by Letters Patent, is—

The herein-described process of producing indigo which consists in treating alpha-thioisatin, made by reacting with sulfureted hydrogen upon an acid solution of alpha-isatin-anilid, with a suitable alkaline solution in presence of sulfureted hydrogen substantially as set forth.

In testimony whereof I have signed my name to this specification in the presence of two subscribing witnesses.

TRAUGOTT SANDMEYER.

Witnesses:
ALBERT GRAETER,
GEO. GIFFORD.